United States Patent Office 3,749,583
Patented July 31, 1973

3,749,583
PREPARATION OF A LACTIC SPREAD
Colin John Cox, Welwyn, and John James Hepburn, Harpenden, England, assignors to Lever Brothers Company, New York, N.Y.
No Drawing. Continuation of abandoned application Ser. No. 844,647, July 24, 1969. This application Dec. 6, 1971, Ser. No. 205,426
Claims priority, application Great Britain, July 26, 1968, 35,817/68
Int. Cl. A23c 9/12
U.S. Cl. 99—59
5 Claims

ABSTRACT OF THE DISCLOSURE

A lactic spread is prepared by a process using the steps of incubating under microaerophilic conditions with thermobacteria an aqueous dispersion containing 0.5% to 25% protein and 15% to 70% fat, and a dry matter content of 20% to 75%, to obtain a pH of 4.8 to 5.4, pasteurizing the incubated mixture, cooling the pasteurized mixture, and working the cooled mixture to form a cohesive plastic mass.

---

This is a continuation of application Ser. No. 844,647 filed July 24, 1969, now abandoned.

This invention relates to a process for the preparation of a lactic spread.

Lactic acid-producing bacteria are used in the production of certain kinds of cheese from milk. Such bacteria include the thermobacteria *Lactobacillus bulgarious* and *Streptococcus thermophilus*. These organisms are also employed in the preparation of yogurt and are responsible for the characteristic yogurt flavour that develops on incubation at 43–45° C. The production of cheese includes a separation stage in which liquid whey is removed from the cheese curds, while in yogurt production a clotted structure is formed, conditions being carefully chosen to avoid wheying off and the separation of curds.

Lactic spreads that are cream cheese-like products can be prepared using media containing milk protein and lactose, by the action of thermobacteria at 43–45° C. and cooling the product to below 20° C. when a suitable pH of 4.8 to 5.2 has been reached, so that further bacterial action is retarded. Separation of whey in the product can be avoided at 20° C. by adopting a sufficiently high milk protein content, but syneresis is observed when the product is subject to freezing and thawing. Moreover, there is a danger that as the bacteria remain alive, sufficient slow fermentation will continue on keeping by the consumer, particularly at ambient temperature, to result in serious deterioration of the product. The bacteria can be killed by pasteurisation but it has been found that this destroys the clotted structure of the product, probably by further protein denaturation, giving a crumbly product that wheys off.

It has now been found that if pasteurisation is effected to kill the culturing bacteria, there can be imparted by subsequent mechanical working a new structure which meets the requirements of a spread, and that this structure has improved freeze-thaw stability. The post-incubation pasteurisation which is thus made practicable not only prevents the further formation of lactic acid by thermobacteria whatever the keeping conditions, but also enables the introduction of flavouring materials without loss of keeping qualities by killing bacteria present in the flavouring material as well as extraneous bacteria inadvertently introduced.

The present invention provides a process for the preparation of a lactic spread comprising the steps of (a) preparing an emulsion containing from 0.5 to 25% protein and from 15 to 70% fat by weight, the total dry matter in the emulsion being from 20 to 75% by weight, by incubating an aqueous dispersion of milk protein and lactose with thermobacteria at fermentation temperature until it has a pH at that temperature of from 4.8 to 5.4, and incorporating fat in the aqueous dispersion before or after incubation, (b) pasteurising the incubated emulsion, and (c) cooling and working the pasteurised emulsion until its form at ambient temperature is that of a cohesive plastic mass.

The milk protein of the aqueous dispersion can be provided by skim milk powder or liquid concentrate, or by soluble casein regenerated from fresh rennet casein, acid casein, or even from matured cheese, or by whey protein, for instance as liquid whey or whey powder. Lactone can be added as such or with milk protein as skim milk powder or concentrate, whey solution or whey powder. Either the initial dispersion can contain the fat, or it can be incorporated after incubation. The fat can be added as cream or butter, or as a vegetable fat having similar properties, for instance, coconut or palm oil or hydrogenated vegetable oil; or as margarine. The concentration of solids in the emulsion subjected to working, especially that of crystalline fat and total protein including casein and other protein, for instance β-lactoglobulin and α-lactalbumin, is sufficiently high to enable a product to be obtained that does not flow unless pressure is applied. The dry matter content (that is, the content other than water) of the emulsion subjected to working is preferably from 25 to 65%, and especially from 40 to 55% by weight. The fat content of the emulsion is in practice from 20 to 50%, and preferably from 35 to 50% by weight. Preferably the emulsion contains from 0.5 or 1 to 20 or 25% of total protein and especially from 3 to 6% milk protein, by weight. Preferably the initial aqueous dispersion contains from 1 to 25% of lactone by weight.

Preferably before incubation the aqueous dispersion is homogenised by passage through a homogeniser or through a colloid mill at a temperature at which the fat present is wholly liquid, for instance at 50 to 65° C. The dispersion can be pasteurised before or after such homogenisation by passage, for instance, through a heat exchanger with holding at 80° C. for 20 seconds in order to destroy bacteria whose presence is not required during the incubation stage.

As thermobacteria it is convenient to use mixtures of *L. bulgarious* and *S. thermophilus*, preferably in cultures containing equal quantities of both organisms. With the latter cultures the optimum incubation temperature is 43–45° C. Sufficient of a liquid skim milk culture to provide rapid bacterial growth can be employed.

During incubation it is preferable to work under microaerophilic conditions, for example by sparging the dispersion with fine bubbles of inert gas, for instance nitrogen, and blanketing its surface with such gas sufficiently to maintain an oxygen concentration in the dispersion of below about 0.5 part per million, without completely eliminating oxygen: an incubation mixture saturated with oxygen contains 2 parts per million.

Preferably the fermentation is allowed to develop a pH of from 4.9 to 5.1, and especially 5.0, at the relevant temperature before the post-incubation pasteurisation, in order to avoid full formation of the typical yogurt acidity and flavour and provide a base to which any desired flavour can be given by the incorporation of suitable materials. Examples of suitable flavouring materials are salt, cheese, dried celery, dried chives, yeast powder, bacon flavour powder, tomato puree, strawberry puree and banana essence, added in quantity according to taste. Thus 13% of tomato puree by total weight of the product can be added. Sorbic acid as the potassium salt, for instance in quantities of about 0.1% by weight of the product, can be added as a preservative if desired. A small amount, say 0.05 to 0.4% of stabiliser, for instance an edible gum, for example gum tragacanth or locust bean gum; or propylene glycol alginate, can also be incorporated before or after incubation to improve texture or assist in maintaining freeze-thaw stability of the product.

In order to prevent over-ripening due to any hold-up in the incubating vessel it is convenient to cool the vessel shortly before the final pH is reached and to stir its contents so that they are cooled while flavouring material is being added and dispersed, and incubation is preferably checked at a pH of from 5.1 to 5.2 by this cooling so that when flavouring is complete, the desired pH of 4.9 to 5.1 is reached.

Where fat is incorporated in the incubated mixture by addition after incubation, it is dispersed, for instance by homogenisation. The resulting emulsion (flavoured or unflavoured) is then pasteurised and the pasteurised emulsion cooled and worked until at ambient temperature it forms a cohesive plastic mass. A further homogenisation can in any case be effected before cooling and working if desired. Cooling is preferably effected simultaneously with working, as in a scraped-surface tubular heat exchanger in which heat is removed and working is effected. The post-incubation pasteurisation can be carried out in a plate heat exchanger where the emulsion is sufficiently fluid but is preferably conducted in a scraped-surface tubular heat exchanger, and two such scraped-surface heat exchangers, one to heat for pasteurisation and the other to cool and work, can be run in series or integrally. The degree of working during cooling is adjusted by choice of residence time and rotary shaft speed so that the product when obtained at ambient temperature is on the one hand cohesive rather than crumbly, and on the other not sufficiently pourable to flow unless pressure is applied. Preferably at least part of the working is carried out at between 0° and 55° C., and especially at between 35 and 50° C. The rate of working can be varied according to the viscosity of the emulsion through the range of temperature drop. The conditions of cooling and working required for any particular emulsion can be adjusted as required by testing the properties of the worked product, for instance by measuring its hardness value using a cone penetrometer test.

A gas phase can be dispersed in the emulsion during the later stages of working, for instance using the same technique as in ice cream production, and air, nitrogen, or other suitable gas introduced to provide a gas content of from 2 to 50% by volume. It has been found that the introduction of such a gas phase assists in improving the stability of the final product, and also reduces the sheen on the surface of an extruded product and thus improves its appearance.

The product can be extruded after the working step at a suitable temperature, which will generally be between 0° and 50° C., and filled into containers for consumption. The final product can be stored at any temperature from ambient temperature down to −27° C.

The invention is illustrated by the following examples, in which all temperatures are in ° C.

EXAMPLE 1

Spray-dried skim milk powder (10 parts by weight) was dispersed in water (40.25 parts) by stirring and the dispersion heated to 50°, molten unsalted New Zealand butter (43.5 parts) added, and the mixture passed through a plate heat exchanger at 80° with holding at that temperature for 20 seconds to pasteurise it.

The pasteurised dispersion was homogenised by passage through a homogeniser at 65° at a pressure of 1500 p.s.i. The resulting dispersion, whose pH was 6.3, was charged into an incubating vessel, cooled to 45° by means of a cooling jacket and a liquid skim milk culture (5 parts) containing equal amounts of *L. bulgarious* and *S. thermophilus* was added. The incubation mixture thus obtained was an aqueous dispersion containing 47.8 parts (48.1%) of dry matter, 36.7 parts, 36.9%) of fat, 4.0 parts (4.1%) of total protein and 5.5 parts (5.5% of lactose, by weight. After stirring for 10 minutes the mixture was incubated at 44° and the formation of lactic acid followed by pH measurement. When the pH measured at 44° had reached 5.2 (this required about 2½ hours) a 25% aqueous common salt solution (3 parts) and suitable flavour were added, the mixture stirred and cooled rapidly to about 25°, at the end of which the pH had reached 5.0 at that temperature.

The ripened aqueous emulsion was heated to 80° and held at that temperature for 20 seconds by passing it through a steam-heated scraped-surface tubular heat exchanger to re-pasteurise it and then through a liquid ammonia-cooled scraped-surface tubular heat exchanger to effect cooling and working from this it was extruded at 45°, filled into small tubs and blast-frozen to −27°.

When the product was allowed to thaw by standing at 5° for 12 hours or at ambient temperature for 2 hours it retained its homogeneity and no wheying off was observed. At ambient temperature it was in the form of a cohesive plastic mass.

EXAMPLE 2

A lactic spread was prepared as in Example 1, except that cooling and working was continued while the temperature was reduced to 5°, and in the last stage nitrogen was introduced by beating until 20% of gas by volume had been incorporated. The product was stored at 2°, at ambient temperature it was a cohesive plastic mass.

EXAMPLE 3

A lactic spread was prepared as in Example 1, except that instead of passing the pasteurised dispersion through a homogeniser at 1500 p.s.i., it was passed through a colloid mill at 65° before charging into the incubating vessel, and after the second pasteurisation the emulsion was passed through a homogeniser at 1500 p.s.i. before cooling and working.

EXAMPLE 4

An incubation mixture was prepared as in Example 1 from spray-dried skim milk powder (9.75 parts by weight), whey powder (2.75 parts), water (33 parts), unsalted butter (42.5 parts) and culture (5 parts), the whey powder being added with the milk powder. The resulting dispersion contained 49.5 parts (53.2%) of dry matter, 35.9 parts (38.6%) of fat, 4.3 parts (4.6%) of total protein and 7.3 parts (7.9%) of lactose.

The dispersion was incubated as in Example 1 to a pH of 5.2, except that it was sparged with nitrogen gas and its surface blanketed with nitrogen in such a way as to start the incubation with the oxygen concentration at 0.4 part per million. A 25% aqueous common salt solution (6.7 parts), cheddar cheese in extruded noodles of 3–4 mm. diameter (5 parts), locust bean gum (0.2 part) and potassium sorbate (0.1 part) were then added while the emulsion was stirred and cooled to 25°; the final pH at 25° was 5.0.

The ripened emulsion was re-pasteurised, cooled and worked as in Example 1, except that extrusion was effected at 5°, and the product was filled into tubs and chilled to 0°.

EXAMPLE 5

A lactic spread was prepared as in Example 4, except that nitrogen gas was introduced at the cooling and working stage until 35% of gas by volume had been incorporated.

EXAMPLE 6

Spray-dried skim milk powder (9.75 parts by weight) and whey powder (2.75 parts) were dispersed in water (33 parts) by stirring, the dispersion heated to 50° and pasteurised by passing it through a plate heat exchanger at 80° with holding at that temperature for 20 seconds.

Liquid skim milk culture (5 parts) containing equal amounts of *L. bulgarious* and *S. thermophilus* was stirred into the mixture and incubation to pH 5.2 was effected as in Example 1 except that the mixture was sparged with nitrogen as in Example 4.

Molten unsalted New Zealand butter (42.5 parts) was stirred into the ripened mixture, and the resulting emulsion homogenised at a pressure of 1500 p.s.i. This emulsion contained 49.1 parts (45.6%) of dry matter, 36 parts (32.5%) of fat and 4.3 parts (4.0%) of total protein. Flavouring material, stabilising agent and preservative were added as in Example 4 and the mixture stirred and cooled to 25°; the final pH at 25° was 5.0.

The emulsion was re-pasteurised, cooled and worked as in Example 1, to give a product that at ambient temperature was in the form of a cohesive plastic mass.

EXAMPLE 7

An incubation mixture was prepared as in Example 1 from spray-dried skim milk powder (10.4 parts by weight), whey powder (2.75 parts), water (38.85 parts), freshly refined coconut oil (36.0 parts) and culture (5 parts), the whey powder being added with the milk powder. The resulting dispersion contained 47.8 parts (51.4%) of dry matter, 36.2 parts (38.9%) of fat, 4.3 parts (4.6%) of total protein and 7.5 parts (8.1% of lactose).

This dispersion was incubated as in Example 1 to a pH of 5.2, after which an aqueous solution containing common salt (1.15 parts), locust bean gum (0.2 part), potassium sorbate (0.12 part) and water (5.53 parts) was added with stirring, together with flavour, and the mixture was rapidly cooled to about 25°, when the pH at that temperature was 5.0.

The ripened emulsion was heated to 80° and held at that temperature for 20 seconds by passing it through a steam-heated scraped-surface tubular heat exchanger to re-pasteurise it and then through a liquid ammonia-cooled scraped-surface tubular heat exchanger while introducing nitrogen gas: the product was worked and cooled to 5° and then filled into small tubs and stored at 2°. The resulting material, which at ambient temperature was a cohesive plastic mass, contained 35% of nitrogen by volume.

What is claimed is:

1. A process for the preparation of a lactic spread comprising the steps of:

(a) incubating with a mixture of *L. bulgarious* and *S. thermophilus* at fermentation temperature until a pH of from 4.8 to 5.4 is obtained, an aqueous dispersion containing from 0.5 to about 25% protein and 20–50% by weight emulsified fat, the total dry matter in said emulsion being from about 25–65% by weight, said incubation being effected under microaerophilic conditions whereby the oxygen concentration during incubation is maintained below 0.5 part per million;

(b) pasturising, without whey removal the incubated emulsion; and (c) cooling the pasteurised emulsion and working it at between 0° and 55° C. until its form at ambient temperature is that of a cohesive plastic mass.

2. A process according to claim 1, in which the pH of the emulsion immediately before pasteurisation is from 4.9 to 5.1.

3. A process according to claim 1, in which cooling and working are effected simultaneously.

4. The process of claim 1 wherein said fat is added prior to incubation.

5. The process of claim 1 wherein said fat is added subsequent to incubation.

References Cited

UNITED STATES PATENTS

| | | | |
|---|---|---|---|
| 3,539,363 | 11/1970 | Morgan et al. | 99—59 X |
| 1,120,330 | 12/1914 | Odle | 99—59 |
| 3,269,842 | 8/1966 | Mayer et al. | 99—59 |
| 3,397,994 | 8/1968 | Elenbogen et al. | 99—116 |

FOREIGN PATENTS

| | | | |
|---|---|---|---|
| 161,169 | 3/1955 | Australia | 99—59 |

OTHER REFERENCES

Kosikowski, F., Cheese and Fermented Milk Foods, published by the author (1966), distributed by Edwards Brothers, Inc., Ann Arbor, Mich. (pp. 47–50, 58 and 59).

Lambert, L. M., Modern Dairy Products, Chemical Publ. Co. Inc., N.Y. (1965), (pp. 245–251).

A. LOUIS MONACELL, Primary Examiner

D. M. NAFF, Assistant Examiner